United States Patent
Etscheid et al.

(10) Patent No.: US 11,480,284 B2
(45) Date of Patent: Oct. 25, 2022

(54) HEATED MEDIA LINE

(71) Applicant: VOSS AUTOMOTIVE GMBH, Wipperfurth (DE)

(72) Inventors: Tobias Etscheid, Lindlar (DE); Marco Isenburg, Ratingen (DE); Christian Zwillus, Bergneustadt (DE)

(73) Assignee: VOSS Automotive GmbH, Wipperfürth (DE)

( * ) Notice: Subject to any disclaimer, the term of this patent is extended or adjusted under 35 U.S.C. 154(b) by 179 days.

(21) Appl. No.: 15/563,353

(22) PCT Filed: Mar. 8, 2016

(86) PCT No.: PCT/EP2016/054857
§ 371 (c)(1),
(2) Date: Sep. 29, 2017

(87) PCT Pub. No.: WO2016/155988
PCT Pub. Date: Oct. 6, 2016

(65) Prior Publication Data
US 2018/0080591 A1 Mar. 22, 2018

(30) Foreign Application Priority Data
Mar. 31, 2015 (DE) .......................... 102015104947.3

(51) Int. Cl.
*F16L 53/00* (2018.01)
*F16L 11/16* (2006.01)
(Continued)

(52) U.S. Cl.
CPC ............... *F16L 53/38* (2018.01); *F16L 11/11* (2013.01); *F16L 11/16* (2013.01); *H05B 3/26* (2013.01);
(Continued)

(58) Field of Classification Search
CPC .......... F24H 1/102; F24H 1/009; F24H 1/142; F24H 1/162; F16L 53/38; F16L 11/11;
(Continued)

(56) References Cited

U.S. PATENT DOCUMENTS 4,350,872 A * 9/1982 Meywald ................. H05B 3/46
219/532
5,060,287 A 10/1991 Van Egmond
(Continued)

FOREIGN PATENT DOCUMENTS

DE 10137976 A1 11/2002
DE 102013226629 A1 6/2015
(Continued)

OTHER PUBLICATIONS

Elektrisola, 2 pages, Jul. 2011 www.elektrisola.com/conductor-materials/copper-nickel-alloys/cuni10.html (Year: 2011).*

*Primary Examiner* — Justin C Dodson
(74) *Attorney, Agent, or Firm* — Eric J. Sosenko; Jonathan P. O'Brien; Honigman LLP

(57) ABSTRACT

A heat conductor and a heated media line having an inner tubular fluid line and at least one heat conductor arranged on the periphery thereof. The heat conductor is formed by a braid made of twisted individual wires and, in particular, an outer protective sheath surrounding the heat conductor and the fluid line. The braid is formed by at least six individual wires surrounding a support element, of which at least one individual wire is made of a copper-nickel (CuNi) alloy, and the remaining individual wires are produced from copper (Cu) or from a nickel-chromium (NiCr) alloy. All of the individual wires have the same diameter.

9 Claims, 5 Drawing Sheets

(51) Int. Cl.
  *F16L 11/11* (2006.01)
  *H05B 3/44* (2006.01)
  *H05B 3/58* (2006.01)
  *F16L 53/38* (2018.01)
  *H05B 3/26* (2006.01)
  *H05B 3/56* (2006.01)
(52) U.S. Cl.
  CPC ............... H05B 3/44 (2013.01); H05B 3/56 (2013.01); H05B 3/58 (2013.01); *H05B 2203/014* (2013.01); *H05B 2214/02* (2013.01)
(58) Field of Classification Search
  CPC .. F16L 11/16; H05B 3/06; H05B 3/26; H05B 3/40; H05B 3/56; H05B 3/58; H01C 17/02; H01C 17/04
  USPC .......................... 392/479, 480, 481, 483, 484
  See application file for complete search history.

(56) References Cited

U.S. PATENT DOCUMENTS

| | | | | |
|---|---|---|---|---|
| 6,005,232 | A * | 12/1999 | Janvrin | H05B 3/146 219/549 |
| 2006/0151477 | A1 * | 7/2006 | Sundal | H05B 3/56 219/549 |
| 2006/0289189 | A1 * | 12/2006 | Aisenbrey | H05B 3/12 174/36 |
| 2008/0196917 | A1 * | 8/2008 | Hofmann | B60S 1/488 174/47 |
| 2008/0290080 | A1 * | 11/2008 | Weiss | H05B 1/0238 219/202 |
| 2009/0238547 | A1 * | 9/2009 | Borgmeier | F16L 53/38 392/465 |
| 2009/0320745 | A1 * | 12/2009 | D'Evelyn | H05B 3/46 117/81 |
| 2010/0126986 | A1 * | 5/2010 | Gunzing | F16L 11/085 219/643 |
| 2012/0154104 | A1 * | 6/2012 | Hetzler | G01R 1/203 338/49 |
| 2013/0163970 | A1 * | 6/2013 | Schwarzkopf | F16L 53/38 392/478 |
| 2014/0008351 | A1 * | 1/2014 | Verstraeten | H05B 3/342 219/553 |
| 2014/0339211 | A1 * | 11/2014 | Barfuss | B60N 2/002 219/202 |

FOREIGN PATENT DOCUMENTS

| | | |
|---|---|---|
| DE | 102014012851 A1 | 3/2016 |
| EP | 2137449 B1 | 6/2011 |
| FR | 1126046 A | 11/1956 |
| WO | 2013026560 A1 | 2/2013 |

* cited by examiner

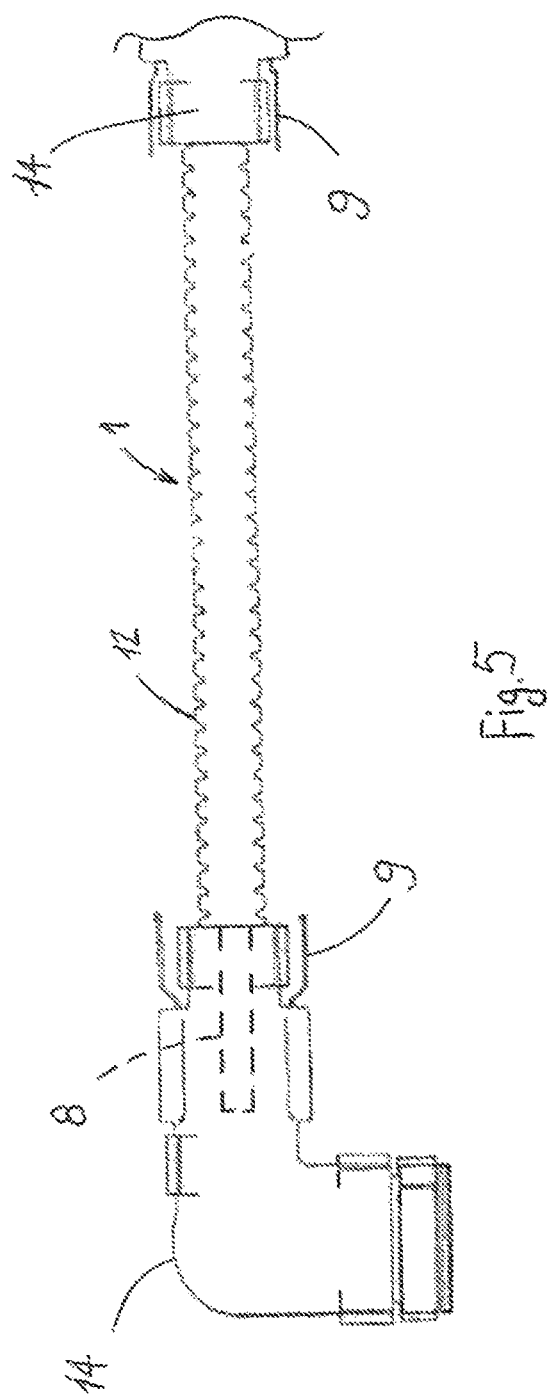

HEATED MEDIA LINE

BACKGROUND

1. Field of the Invention

The present invention relates to a heated media line comprising an inner tubular or hose-shaped fluid line and at least one electric heat conductor disposed over its circumference. More specifically, the electric heat conductor includes a braid made of stranded individual wires and an outer protective sheath surrounds the heat conductor and the fluid line.

2. Description of Related Technology

Such a media line is known, for example, from EP 2 137 449 B1.

For selective catalytic reduction (SCR) lines in the automotive field, the thawing of the lines must be ensured over a large voltage range.

For example, the thawing of a media line at voltages of 12 V to 16 V or 24 to 32 V within a short time at very low temperatures, for example, at 12 V within 25 minutes at minus 30° C. A specific power is required to meet this requirement, which in turn, however, should not lead to an overheating of the media line and any additional components that are connected at 16 V and at a higher environmental temperature, for example, room temperature. A relatively exact resistance value, which can in turn be used for an exact line length and a limited length range with respect to this length, is required to be able to properly adjust the power for such a line. If several different line lengths are to be calculated and designed precisely for this power, then many different resistance values must be used for the heat conductor, wherein the resistance value for the heat conductor is measured in Ω/m.

From DE 101 3 976 A1 there are known electric lines for heating a seat of a motor vehicle, wherein the individual strands of the braid of the electric line are made from materials having different specific resistances, wherein pure copper and a copper alloy, such as, for example, CuSn6, are used.

The resistance value of a heat conductor can be adjusted by use of different alloys and the variation of the cross-section.

A further requirement with SCR lines is an as small as possible installation space. The outer diameter of the line, and especially the outer diameter of the outer protective sheath, which is configured, for example, as a corrugated pipe, should be reduced, for example, to minimize the installation space. The free space between the fluid line and the outer protective sheath decreases due to this reduction. The outer diameter of the heat conductor would have to be reduced in this case to furthermore heat the fluid line with heat conductors. The area available for different cross sections for generating different resistance values is also automatically restricted due to the reduction of the heat-conductor outer diameter, and the required resistance values can no longer be adjusted exactly enough.

SUMMARY

It is an object of the invention to make possible an exact adjustment of the braid resistance over a wide range with small braid outer diameters, for example, within the range of 0.8 to 1.5 mm, and with a sufficient tensile strength of the braid, and additionally reduce the manufacturing costs.

This is attained according to the principles of the present invention in that the braid comprises at least six individual wires twisted around a support element, of which wires at least one individual wire is made from a CuNi alloy, and the remaining individual wires are manufactured from Cu or a NiCr alloy, and wherein all individual wires have the same wire diameter. According to the invention, the individual wires of the braid are thus no longer made as is usual from the same metal, but rather of different materials and especially of a copper-nickel alloy, copper, or a nickel-chromium alloy. Due to this variation, the resistances can be adjusted exactly enough so that the diameter of the individual wires can furthermore also be limited to a single diameter. The quantities for the respective wires for each material used are thereby greatly increased and the variants greatly reduced. This results in less warehousing of the different individual wires as well as an increased production of identical parts, whereby the braid used according to the invention can be manufactured more economically. The definition of an identical, single diameter furthermore has the advantage that only one cross section must be considered for the contacting and one constant sheath thickness must be considered when stripping during the production of the media line according to the invention.

According to another aspect of the invention, it is furthermore advantageous if the support element is formed as a plastic profile having a cross section corresponding to the cross section of the electrical individual wires. The tensile strength of the used braid can be significantly increased due to the use of the support element made of plastic, wherein, for example, a tension-resistant material, such as Kevlar®, Vectran® or the like can be used.

According to a further aspect of the invention, it can be advantageous if the support element is formed as a single wire which has a cross section of the same size as the remaining individual wires and is made from the same materials as one or more of the remaining individual wires. The braid, which is formed, for example, by six, seven, nineteen, or thirty-seven individual wires, represents an optimum compromise between the thickest possible individual wires, a constantly small cross section, a round construction, and a smallest possible outer diameter. A round construction can be ensured even in a braid made of nineteen or thirty-seven individual wires.

Using the principles of the present invention, it is possible to realize a cross section of 0.2 mm² for the twisted individual wire bundle, and specifically in connection with a preferred individual wire diameter of 0.19 mm with six or seven individual wires. According to a further aspect of the invention, an outer diameter of the heat conductor or braid of 1.10 mm is realized. A minimum wall thickness of a plastic sheath or braid insulation of 0.2 mm is advantageous in the heat conductor made available in accordance with the principles of the present invention. The wall thickness is preferably nominally 0.265 mm.

According to another aspect of the invention, it is expedient if the resistance of each individual wire is selected so that a total resistance of the braid is in the range of 0.097 to 4.651 Ω/m, and especially a total resistance in the range of 0.097 to 0.978 Ω/m, as well as preferably in the range of 0.119 to 0.652 Ω/m is present. The following materials are used as copper-nickel alloys for the individual wires according to the invention:

CuNi1 with a specific resistance of 0.0250,
CuNi2 with a specific resistance of 0.0500, CuNi6 with a specific resistance of 0.1000,
CuNi10 with a specific resistance of 0.1500,
CuNi15 with a specific resistance of 0.2100,
CuNi23Mn with a specific resistance of 0.3000,
CuNi30Mn with a specific resistance of 0.4000, and
CuNi44 with a specific resistance of 0.4900.

The specific resistance is measured herein in $\Omega mm^2/m$ at 20° C. The alloy NiCr3020 having a specific resistance of 1.040 $\Omega mm^2/m$ at 20° C. is suitably used as the nickel-chromium alloy. A combination of the individual wires is suitably obtained in a braid so that the range of the specific resistances of the individual wires is 0.008 to 0.74 $\Omega mm^2/m$ at 20° C.

It is advantageous if the weight of the sheathed heat conductor is 2 to 4 g/m, preferably 2.6 g/m. A corrugated tube is preferably used as protective sheath for the fluid line according to the invention.

The media line according to the invention can furthermore have a respective connector piece at least at one end, which connector piece is connected to the fluid line in a positive and/or non-positive or material-locking manner, wherein the heat conductor of the media line is continued or is attached as an independent heat element over the circumference of the connector piece.

The invention furthermore relates to an electric heat conductor according to the previously described features of the media line according to the invention.

The invention is described in more detail with reference to the exemplary embodiment depicted in the enclosed drawings.

BRIEF DESCRIPTION OF THE DRAWINGS

In the drawings:
FIG. 5 shows a media line in accordance with the principles of the present invention and having a connector piece at least at one end.

In the various figures of the drawings, identical parts are always provided with the same reference numerals.

DETAILED DESCRIPTION

With respect to the subsequent description it is expressly noted that the subject matter considered to be the invention is not limited to all or several features of the described combinations of features, but rather that any individual features or partial group of features of the exemplary embodiment can also have an inventive importance, even when separated from all other partial features described in connection therewith, and also in combination with other features, as well as independently from the feature combinations and dependencies of the claims.

Figure 1:
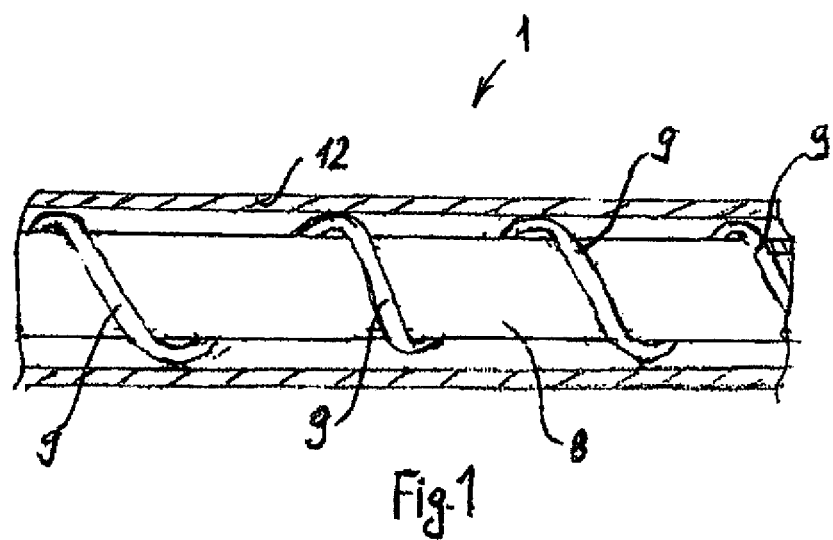
FIG. 1 shows a partial longitudinal section through a media line incorporating the principles of the present invention.
Figure 2:
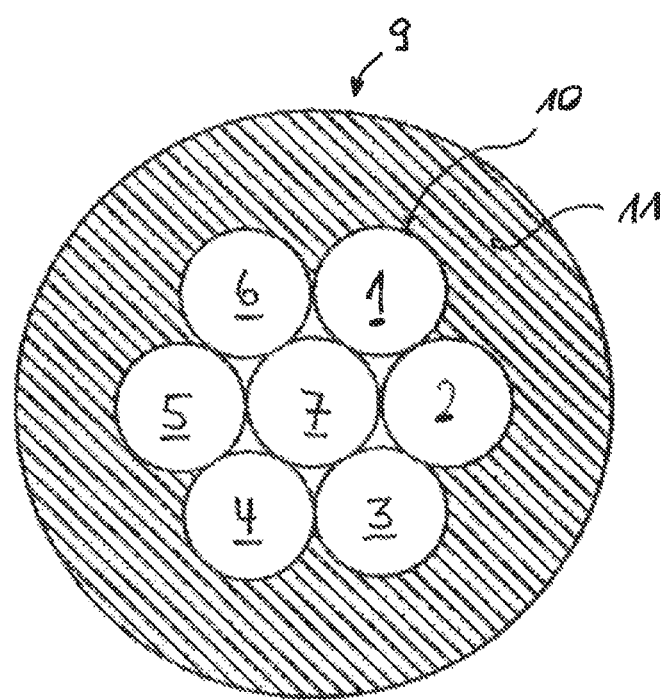
FIG. 2 shows a cross section through a braid, having seven individual wires, of the media line seen in FIG. 1.

As is depicted in FIG. 1, a media line 1 comprises an inner fluid line 8, configured as a tube or hose, and an electric heat conductor 9 arranged over its circumference. The heat conductor 9 includes a braid 10 of, for example, seven, twisted individual wires 1-7, as seen in FIG. 2. The braid 10 suitably has an electrical insulation 11 that envelops the twisted individual wires 1-7. The fluid line 8, with the heat conductor 9 arranged over the circumference, is further surrounded by an outer protective sheath 12, which can be configured, for example, as a corrugated tube. As illustrated in FIG. 1, the heat conductor 9 can extend helically around the fluid line 8. However, heat conductor 9 can also run in a straight line parallel to the fluid line 8.

As shown in FIG. 2, the braid 10 may include seven twisted individual wires 1-7, which all have the same diameter. It also falls within the scope of this disclosure that the central individual wire 7 may be instead provided as a support element 7 made of plastic, having the same diameter as the individual wires 1-6 surrounding said support element 7.

It is provided according to the invention that the individual wires 1-6 or 1-7 are produced in such a way with regard to the material that at least one of the individual wires 1-6 or 1-7 is made from a copper-nickel alloy, and the remaining individual wires are produced either from copper or from a copper-nickel alloy or from a nickel-chromium alloy.

In the exemplary embodiments depicted in FIG. 2, the individual wires 1-7 of heat conductor 9 can be configured with regard to the material according to the following Table 1:

TABLE 1

| Braid | R $\Omega$/m | Wire 1 Material | Wire 2 Material | Wire 3 Material | Wire 4 Material | Wire 5 Material | Wire 6 Material | Wire 7 Material |
| --- | --- | --- | --- | --- | --- | --- | --- | --- |
| Example 1 | 0.097 | Cu | Cu | Cu | Cu | Cu | CuNi1 | CuNi1 |
| Example 2 | 0.119 | Cu | Cu | Cu | CuNi1 | CuNi1 | CuNi1 | CuNi6 |
| Example 3 | 0.436 | CuNi2 | CuNi2 | CuNi6 | CuNi6 | CuNi6 | CuNi10 | CuNi10 |
| Example 4 | 2.658 | CuNi30Mn | CuNi44 | CuNi44 | CuNi44 | CuNi44 | CuNi44 | NiCr3020 |
| Example 5 | 4.651 | CuNi44 | NiCr3020 | NiCr3020 | NiCr3020 | NiCr3020 | NiCr3020 | NiCr3020 |

In Table 2 are contained further inventive material combinations of heat conductor 9 consisting of seven individual wires.

TABLE 2

| Braid | R $\Omega$/m | Wire 1 Material | Wire 2 Material | Wire 3 Material | Wire 4 Material | Wire 5 Material | Wire 6 Material | Wire 7 Material |
| --- | --- | --- | --- | --- | --- | --- | --- | --- |
| Example 1 | 0.131 | Cu | Cu | Cu | CuNi1 | CuNi2 | CuNi2 | CuNi2 |
| Example 2 | 0.145 | CuNi1 | CuNi1 | CuNi1 | CuNi1 | CuNi1 | CuNi1 | CuNi6 |

TABLE 2-continued

| Braid | R Ω/m | Wire 1 Material | Wire 2 Material | Wire 3 Material | Wire 4 Material | Wire 5 Material | Wire 6 Material | Wire 7 Material |
|---|---|---|---|---|---|---|---|---|
| Example 3 | 0.177 | CuNi1 | CuNi1 | CuNi1 | CuNi1 | CuNi2 | CuNi2 | CuNi15 |
| Example 4 | 0.198 | CuNi1 | CuNi1 | CuNi1 | CuNi1 | CuNi6 | CuNi10 | CuNi10 |
| Example 5 | 0.218 | CuNi1 | CuNi1 | CuNi2 | CuNi2 | CuNi2 | CuNi2 | CuNi10 |
| Example 6 | 0.242 | CuNi1 | CuNi2 | CuNi2 | CuNi2 | CuNi2 | CuNi2 | CuNi6 |
| Example 7 | 0.326 | CuNi2 | CuNi2 | CuNi2 | CuNi2 | CuNi2 | CuNi10 | CuNi15 |
| Example 8 | 0.397 | CuNi2 | CuNi2 | CuNi2 | CuNi6 | CuNi6 | CuNi10 | CuNi15 |

The diameter of the six or seven individual wires is preferably 0.19 mm.

Figure 3:
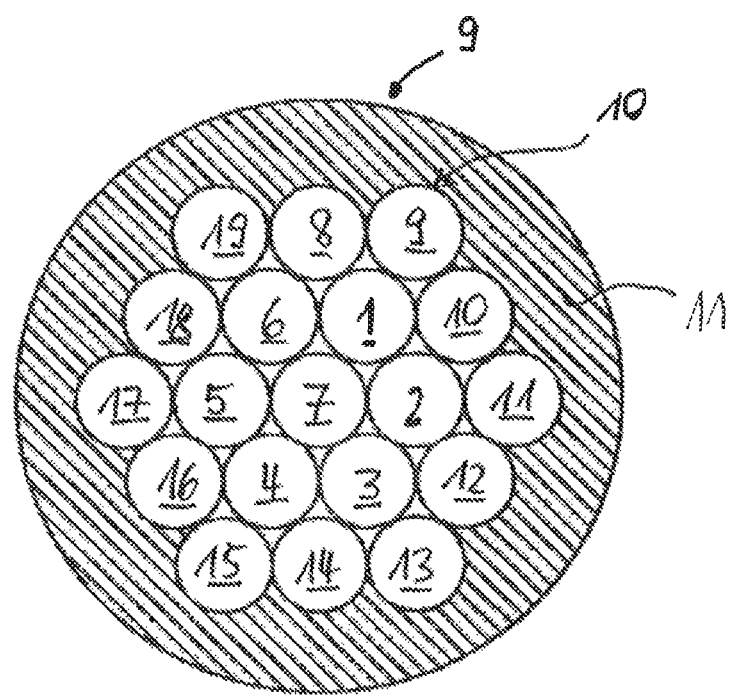
FIG. 3 shows a cross section through a braid, similar to that seen in FIG. 2, having 17 individual wires.
Figure 4:
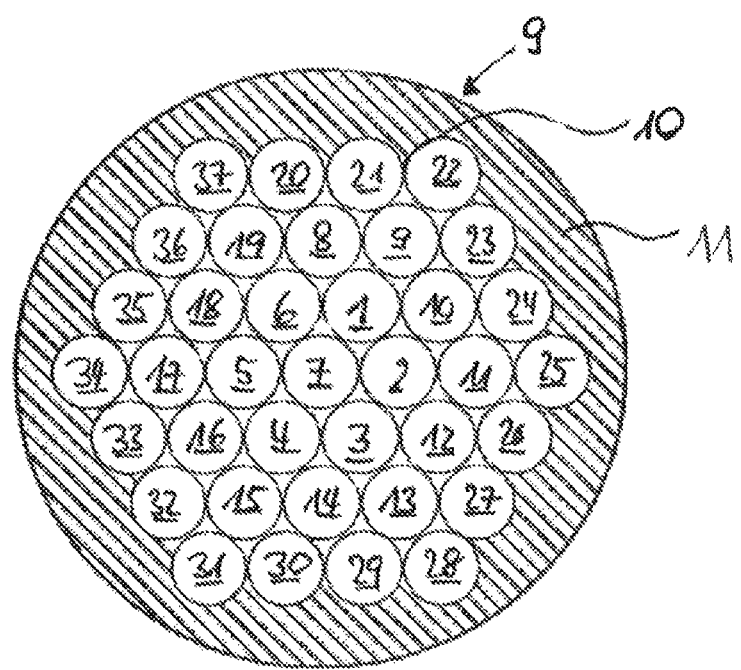
FIG. 4 shows a cross section through a braid, similar to that seen in FIGS. 2 and 3, having 37 individual wires.

It falls within the scope of the disclosure that the heat conductor 9 may be formed by a braid 10 that is manufactured from nineteen or thirty-seven twisted individual wires—as seen in FIGS. 3 and 4 and configured as set out in Tables 3 and 4. The wire diameter of the individual wires is preferably 0.115 mm with nineteen individual wires in the heat conductor 9, and preferably 0.082 mm with thirty-seven individual wires in the heat conductor 9.

TABLE 3

| | | Example 1 | Example 2 | Example 3 | Example 4 | Example 5 |
|---|---|---|---|---|---|---|
| R Ω/m | | 0.131 | 0.145 | 0.162 | 0.177 | 0.198 |
| Wire 1 | Material | Cu | CuNi1 | Cu | CuNi1 | CuNi1 |
| Wire 2 | Material | Cu | CuNi1 | CuNi1 | CuNi1 | CuNi1 |
| Wire 3 | Material | Cu | CuNi1 | CuNi1 | CuNi1 | CuNi1 |
| Wire 4 | Material | Cu | CuNi1 | CuNi1 | CuNi1 | CuNi1 |
| Wire 5 | Material | Cu | CuNi1 | CuNi1 | CuNi1 | CuNi1 |
| Wire 6 | Material | Cu | CuNi1 | CuNi1 | CuNi1 | CuNi1 |
| Wire 7 | Material | Cu | CuNi1 | CuNi1 | CuNi1 | CuNi1 |
| Wire 8 | Material | CuNi1 | CuNi1 | CuNi1 | CuNi1 | CuNi1 |
| Wire 9 | Material | CuNi1 | CuNi1 | CuNi1 | CuNi1 | CuNi1 |
| Wire 10 | Material | CuNi1 | CuNi1 | CuNi1 | CuNi1 | CuNi1 |
| Wire 11 | Material | CuNi1 | CuNi1 | CuNi1 | CuNi2 | CuNi1 |
| Wire 12 | Material | CuNi1 | CuNi1 | CuNi1 | CuNi2 | CuNi2 |
| Wire 13 | Material | CuNi1 | CuNi1 | CuNi2 | CuNi2 | CuNi10 |
| Wire 14 | Material | CuNi2 | CuNi1 | CuNi2 | CuNi2 | CuNi10 |
| Wire 15 | Material | CuNi2 | CuNi1 | CuNi2 | CuNi2 | CuNi10 |
| Wire 16 | Material | CuNi2 | CuNi1 | CuNi2 | CuNi2 | CuNi10 |
| Wire 17 | Material | CuNi2 | CuNi2 | CuNi2 | CuNi2 | CuNi10 |
| Wire 18 | Material | CuNi2 | CuNi2 | CuNi6 | CuNi2 | CuNi10 |
| Wire 19 | Material | CuNi6 | CuNi6 | CuNi6 | CuNi10 | CuNi15 |

TABLE 4

| | | Example 1 | Example 2 | Example 3 | Example 4 | Example 5 |
|---|---|---|---|---|---|---|
| R Ω/m | | 0.131 | 0.145 | 0.162 | 0.177 | 0.198 |
| Wire 1 | Material | Cu | Cu | Cu | CuNi1 | CuNi1 |
| Wire 2 | Material | Cu | CuNi1 | Cu | CuNi1 | CuNi1 |
| Wire 3 | Material | Cu | CuNi1 | CuNi1 | CuNi1 | CuNi1 |
| Wire 4 | Material | Cu | CuNi1 | CuNi1 | CuNi1 | CuNi1 |
| Wire 5 | Material | Cu | CuNi1 | CuNi1 | CuNi1 | CuNi1 |
| Wire 6 | Material | Cu | CuNi1 | CuNi1 | CuNi1 | CuNi1 |
| Wire 7 | Material | Cu | CuNi1 | CuNi1 | CuNi1 | CuNi1 |
| Wire 8 | Material | Cu | CuNi1 | CuNi1 | CuNi1 | CuNi1 |
| Wire 9 | Material | Cu | CuNi1 | CuNi1 | CuNi1 | CuNi1 |
| Wire 10 | Material | Cu | CuNi1 | CuNi1 | CuNi1 | CuNi1 |
| Wire 11 | Material | Cu | CuNi1 | CuNi1 | CuNi1 | CuNi1 |
| Wire 12 | Material | Cu | CuNi1 | CuNi1 | CuNi1 | CuNi1 |
| Wire 13 | Material | Cu | CuNi1 | CuNi1 | CuNi1 | CuNi1 |
| Wire 14 | Material | Cu | CuNi1 | CuNi1 | CuNi1 | CuNi1 |
| Wire 15 | Material | CuNi1 | CuNi1 | CuNi1 | CuNi1 | CuNi2 |
| Wire 16 | Material | CuNi1 | CuNi1 | CuNi1 | CuNi1 | CuNi2 |
| Wire 17 | Material | CuNi1 | CuNi1 | CuNi1 | CuNi1 | CuNi2 |
| Wire 18 | Material | CuNi1 | CuNi1 | CuNi1 | CuNi1 | CuNi2 |
| Wire 19 | Material | CuNi1 | CuNi1 | CuNi1 | CuNi2 | CuNi2 |
| Wire 20 | Material | CuNi1 | CuNi1 | CuNi1 | CuNi2 | CuNi2 |
| Wire 21 | Material | CuNi1 | CuNi1 | CuNi1 | CuNi2 | CuNi2 |
| Wire 22 | Material | CuNi1 | CuNi1 | CuNi1 | CuNi2 | CuNi2 |
| Wire 23 | Material | CuNi1 | CuNi1 | CuNi1 | CuNi2 | CuNi2 |
| Wire 24 | Material | CuNi1 | CuNi1 | CuNi1 | CuNi2 | CuNi2 |
| Wire 25 | Material | CuNi1 | CuNi1 | CuNi1 | CuNi2 | CuNi2 |
| Wire 26 | Material | CuNi1 | CuNi1 | CuNi2 | CuNi2 | CuNi2 |
| Wire 27 | Material | CuNi2 | CuNi1 | CuNi2 | CuNi2 | CuNi2 |
| Wire 28 | Material | CuNi2 | CuNi1 | CuNi2 | CuNi2 | CuNi2 |
| Wire 29 | Material | CuNi2 | CuNi1 | CuNi2 | CuNi2 | CuNi2 |
| Wire 30 | Material | CuNi2 | CuNi1 | CuNi2 | CuNi2 | CuNi2 |
| Wire 31 | Material | CuNi2 | CuNi2 | CuNi2 | CuNi2 | CuNi2 |
| Wire 32 | Material | CuNi2 | CuNi2 | CuNi6 | CuNi2 | CuNi2 |
| Wire 33 | Material | CuNi2 | CuNi2 | CuNi6 | CuNi2 | CuNi2 |
| Wire 34 | Material | CuNi6 | CuNi2 | CuNi6 | CuNi2 | CuNi2 |
| Wire 35 | Material | CuNi6 | CuNi2 | CuNi10 | CuNi2 | CuNi6 |
| Wire 36 | Material | CuNi6 | CuNi2 | CuNi10 | CuNi2 | CuNi6 |
| Wire 37 | Material | CuNi6 | CuNi6 | CuNi10 | CuNi2 | CuNi10 |

According to the invention, it is advantageous if the range of the specific resistance of the individual wires is 0.008 to 0.74 Ωmm²/m at 20° C. The weight of the total line is 2 to 4 g/m, preferably 2.6 to 2.8 g/m. The wall thickness of the electrical insulation 11 of the braid 10 is suitably at least 0.20 mm, and especially nominally 0.265 mm.

It is achieved by means of the present media line 1 that the individual wires 1 to 37 of a braid 10 of a heat conductor 9 can all have the same diameter. The invention additionally allows an exact adjustment of the total resistance of a braid 10 or of the heat conductor 9 so that a precise adjustment of the required heating power is possible. The production and storage costs are furthermore reduced by means of the invention.

As seen in FIG. 5, the media line 1 according to the invention can furthermore have a respective connector piece 14 at least at one end, which connector piece 14 is connected to the fluid line in a positive and/or non-positive or material-locking manner, wherein the heat conductor 9 of the media line 1 is continued or is attached as an independent heat element over the circumference of the connector piece.

The invention is not limited to the depicted and described exemplary embodiments, but rather includes also all embodiments that are functionally identical in the sense of the invention. It is expressly emphasized that the exemplary embodiments are not limited to all features in combination, but rather that each individual partial feature can also have an inventive importance, separately from all other partial features. The invention is furthermore not limited until now to the combinations of features defined in the claims, but rather can also be defined by any other combination of specific features of all the disclosed individual features. This means that in principle practically any individual feature of the independent claim can be omitted or replaced by at least one other individual feature disclosed elsewhere in the application.

The invention claimed is:

1. A heated media line consisting of:
   an inner tubular fluid line and
   at least one electric heat generating conductor arranged over a circumference of the fluid line, the heat generating conductor being a resistive heating element in the form of a braid of stranded individual wires; and of
   an outer protective sheath surrounding the heat generating conductor and the fluid line,
   the braid being formed by at least six stranded individual wires and an inner support element, whereby the individual wires are twisted about and surrounding the inner support element and all of the individual wires of the braid being made of a copper-nickel (CuNi) alloy, one of the individual wires being made of a first copper-nickel alloy, at least one of the other individual wires being made of a second copper-nickel alloy, the second copper-nickel alloy being different than the first copper-nickel alloy; and
   wherein all of the individual wires have a same diameter, the inner support element being formed by an additional individual wire having the same diameter as the other individual wires, the inner support element being made of the same material as the individual wires or of plastic, and wherein all of the individual wires of the braid have a resistance selected so that a total resistance of the braid is in a range of 0.097 to 4.651 $\Omega/m$ over any length of the braid.

2. A heated media line consisting of:
   an inner tubular fluid line and
   at least one electric heat generating conductor arranged over a circumference of the fluid line, the heat generating conductor being a resistive heating element in the form of a braid of stranded individual wires, and of
   an outer protective sheath surrounding the heat conductor and the fluid line;
   wherein the braid is formed by at least six stranded individual wires and an inner support element, wherein the individual wires are twisted about and surrounding the inner support element, the braid is made of
      at least one of the individual wires of the braid is made of a copper-nickel (CuNi) alloy and at least one individual wire of the braid is made of copper (Cu), all other individual wires of the braid being made of one of a copper-nickel (CuNi) alloy and copper (Cu), or
      at least one of the individual wires of the braid is made of a copper-nickel (CuNi) alloy and at least one of the individual wires of the braid is made of a nickel-chromium (NiCr) alloy, all other individual wires of the braid being made of one of a copper-nickel (CuNi) alloy and a nickel-chromium (NiCr) alloy; and
   wherein all of the individual wires have a same diameter, the inner support element being made of a plastic profile having a diameter that is the same as the diameter of the individual wires or the inner support element being formed by an additional individual wire having a diameter that is the same as the diameter of the other individual wires and the inner support element being made of the same material as the individual wires and wherein all of the individual wires of the braid have a resistance selected so that a total resistance of the braid is in a range of 0.097 to 4.651 $\Omega/m$ over any length of the braid.

3. The heated media line according to claim 1 or claim 2, wherein at least one of the individual wires made of a copper-nickel alloy is selected from the group consisting of
   CuNi1 having a specific resistance of 0.0250 $\Omega mm^2/m$,
   CuNi2 having a specific resistance of 0.0500 $\Omega mm^2/m$,
   CuNi6 having a specific resistance of 0.1000 $\Omega mm^2/m$,
   CuNi10 having a specific resistance of 0.1500 $\Omega mm^2/m$,
   CuNi15 having a specific resistance of 0.2100 $\Omega mm^2/m$,
   CuNi23Mn having a specific resistance of 0.3000 $\Omega mm^2/m$,
   CuNi30Mn having a specific resistance of 0.4000 $\Omega mm^2/m$, and
   CuNi44 having a specific resistance of 0.4900 $\Omega mm^2/m$.

4. The heated media line according to claim 2, wherein the nickel-chromium alloy is NiCr3020 having a specific resistance of 1.040 $\Omega mm^2/m$ at 20° C.

5. The heated media line according to claim 1 or claim 2, the individual wires have a specific resistance in the range of 0.008 to 0.74 $\Omega mm^2/m$ at 20° C.

6. The heated media line according to claim 1 or claim 2, wherein each of the individual wires of the braid has a diameter of 0.19 mm.

7. The heated media line according to claim 1 or claim 2, wherein the braid includes nineteen individual wires and each of the individual wires has a diameter of 0.115 mm.

8. The heated media line according to claim 1 or claim 2, wherein the heat generating conductor includes a plastic sheath enclosing the individual wires and the inner support element, and wherein an outer diameter of the heat generating conductor is 1.1 mm.

9. The heated media line according to claim 1 or claim 2, wherein the heat generating conductor has a weight in the range of 2 g/m to 4 g/m.

* * * * *